United States Patent [19]
Wallrafen

[11] Patent Number: 4,646,011
[45] Date of Patent: Feb. 24, 1987

[54] ELECTRONIC ANGULAR POSITION TRANSMITTER WITH TOROIDAL CORE AND ROTATABLE MAGNET

[75] Inventor: Werner Wallrafen, Kelkheim/Ruppertshain, Fed. Rep. of Germany

[73] Assignee: VDO Adolf Schindling AG, Frankfurt am Main, Fed. Rep. of Germany

[21] Appl. No.: 675,572

[22] Filed: Nov. 28, 1984

[30] Foreign Application Priority Data

Dec. 17, 1983 [DE] Fed. Rep. of Germany ....... 3345791

[51] Int. Cl.$^4$ .................. G01B 7/30; G01W 1/00; G01R 33/04
[52] U.S. Cl. .................. 324/208; 33/DIG. 1; 73/188; 324/254
[58] Field of Search ............ 324/207, 208, 253–255, 324/247; 33/DIG. 1; 73/188, 189, 861.08, 73/861.11; 340/870.33–870.35

[56] References Cited

U.S. PATENT DOCUMENTS

| | | | |
|---|---|---|---|
| 3,364,740 | 1/1968 | Wong | 73/188 |
| 3,893,337 | 7/1975 | Jones | 73/188 |
| 4,277,751 | 7/1981 | Lawson et al. | 324/247 X |
| 4,283,679 | 8/1981 | Ito et al. | 324/208 X |
| 4,525,670 | 6/1985 | Miyagawa et al. | 324/208 |

FOREIGN PATENT DOCUMENTS 158502 9/1983 Japan ................... 324/208

*Primary Examiner*—Gerard R. Strecker
*Attorney, Agent, or Firm*—Martin A. Faber

[57] ABSTRACT

In a contact-less electronic angular-position transmitter having a turnable magnet (5), sensor coils (11, 12) arranged at right angles to each other are provided on a toroidal core (9), common to all sensor coils, of a magnetic-field detector formed in accordance with the flux-gate principle in order to determine the angular position. The angular-position transmitter is preferably arranged, together with the turnable magnets and the turnable core having the sensor coils, in a housing (1) which shields them from the terrestrial field. In the said housing, the inner space (2), within which the magnet can turn, is hermetically separated from an inner space (3) in which the toroidal core (9), together with the sensor coils and the electronic system (15–19) is arranged.

3 Claims, 5 Drawing Figures

ELECTRONIC ANGULAR POSITION TRANSMITTER WITH TOROIDAL CORE AND ROTATABLE MAGNET

FIELD AND BACKGROUND OF THE INVENTION

The present invention relates to contact-less electronic angular-position transmitters, in general.

In particular, the invention relates to a contact-less electronic angular-position transmitter for a mechanical setting member, in particular a weather vane, having a magnet which is turnable in proportion to the angle to be measured and having two sensor elements arranged at right angles to each other and adapted to be acted on by a magnetic field produced by the turnable magnet so as to produce one electric signal each, each signal being a measure of one of two field components which are oriented at right angles to each other.

Such angular-position transmitters are used for the remote indication of the position of a mechanical setting member in order to transmit the angular position by electric signals or to process or display it and/or use it for control and regulating systems. Such known angular position transmitters are preferably developed free of contact, i.e. an element which is turned in accordance with the setting member is not directly in contact with the sensor elements, so as to avoid basic disadvantages such as wear by friction and inaccurate adjustment of the turnable element.

In this connection, it is part of the prior art, particularly in the case of a wind measuring system, to couple a weather vane mechanically with a ferromagnetic toroidal magnet which is turnable within the field of influence of two Hall elements which are arranged at right angles to each other. As a result of the relatively slight sensitivity of the Hall elements as referred to the usable variable magnetic field, the turnable magnet must be turnable in the direct vicinity of the Hall elements.

The fact that the output signals of the Hall elements drift relatively substantially, for instance under the influence of temperature, is also disturbing. This results in the need for a high usable flux concentration, produced by the rotary magnet in the region of the Hall elements. Aside from this, an angular-position transmitter having Hall elements is rather expensive to produce for various reasons; the permanently magnetic toroidal magnet which is required because of the high flux concentration is relatively expensive. In addition, there are fabricating expenses resulting, for instance, from precise alignment of the two Hall elements at right angles to each other, which alignment must be continuously maintained.

The state of the art includes, furthermore, so-called synchros, one of which is provided on the transmitter side and one on the receiver side. The synchros have, within a stator, three coils which are 120° apart and which are excited by alternating fields corresponding to the position of a rotor. The synchros on the transmitter side and the receiver side are connected to each other by three-wire lines (electric wave) and act in the manner that a rotor on the receiver side tracks the rotor on the transmitter side. With these synchros, to be sure, certain disadvantages of the Hall elements discussed above are avoided, but the cost of manufacture is even greater, particularly because of the synchro which is to be provided on the receiver side and which cannot be readily replaced by an electronic evaluation system. Such angular-position transmitters, therefore, are frequently only suitable if larger torques are to be produced on the receiver side.

The object of the present invention is, therefore, to provide a contact-less electronic angular-position transmitter which can be favorably assembled in mass production, which is characterized by a high degree of dependability and lack of sensitivity to the influences of temperature and moisture, and which is not critical with respect to the arrangement of the turnable magnet with regard to the sensor elements.

SUMMARY OF THE INVENTION

According to the invention, as each of the two sensor elements there is provided at least one sensor coil (11, 12) arranged on a toroidal core (9), common to all sensor coils, of a magnetic field detector developed in accordance with the flux-gate principle.

The invention is based on the principle that the position of the turnable magnet is determined by evaluation of the signal voltages induced in two sensor coils which are arranged perpendicular to each other, said sensor coils, the toroidal core and the electronic device for evaluation of the signal voltages which is connected to the sensor coils being developed in accordance with the well-known flux-gate principle. Such flux-gate arrangements have been heretofore, however, only for detection of the direction of the terrestrial magnetic field, for which purpose the fluxgate arrangement was dimensioned with corresponding sensitivity (Hisatsugu Itoh "Magnetic Field Sensor and Its Application to Automobiles" in SAE/SP-80/458/SO250 of the Society of Automotive Engineers). This flux gate can be used to the extent set forth below for the carrying out of the present invention.

An exciter winding and—arranged at right angles to each other—two sensor coils are arranged on a toroidal core of ferrite. The sensor coils are, in particular, so wound on the toroidal core that the harmonics of odd order of the signal voltages induced in the sensor coils are suppressed. The second harmonic of the signal voltage is generally evaluated in the manner that after it has been filtered out, amplified and detected in proper phase and the constant voltages obtained have been further amplified, it represents a voltage signal which is proportional to the cosine of the angle of incidence of the principal direction of the magnetic field with respect to an axis lying in a plane of the toroidal core. The voltage, processed in the same manner, which is induced in the second sensor coil which is at right angles to the first sensor coil contains a second harmonic which is substantially proportional to the sine of the said angle of incidence. The detection in proper phase, therefore, is effected in both cases with twice the exciter frequency. In order to linearize the arrangement, the rectified voltage derived from the second harmonic can furthermore be fed back into the sensor coil so that the flux produced in the toroidal core by the external magnetic field is compensated for. The further evaluation of the two voltages derived from the second harmonic, corresponding to the cosine and the sine of the angle of incidence of the magnetic field, can be effected with a quotient-measurement mechanism for indicating a corresponding variable, or else with an electronic comparator and logic circuits for the selective activating of segments of an LED display or of a liquid-crystal display.

This flux-gate principle, however, is so modified in the present invention that it is not the terrestrial magnetic field which is evaluated but, rather, the angular position of the magnet, which is turnable in proportion to a mechanical setting member. For this purpose, measures are taken, in particular, to exclude the influence of the terrestrial magnetic field on the toroidal magnet having the sensor coils. This is effected either by a special suitable shielding which is described further below, or by concentration of the magnetic field produced by the rotating magnet in proportion to the terrestrial magnetic field, which is disturbing here. For the last-mentioned purpose, however, a substantially larger distance between the rotary magnet and the toroidal core bearing the sensor elements is permissible than in the case of the known use of Hall elements.

The flux-gate principle, in its present application for the indicating of the angular position of a mechanical setting member, has the advantage, inter alia, that the shape of the turnable magnet is not critical. In particular, the turnable magnet need not be developed as a relatively expensive permanent magnet of toroidal shape. The arrangement of the sensor coils at a right angle to each other on the toroidal core of ferromagnetic material which has the characteristic curve necessary for the voltage induction in accordance with the flux-gate principle is, on the other hand, to be compared with the arrangement of the Hall elements with respect to each other: since the sensor coils are fixed on their common toroidal core when they are wound, this core can be readily handled in subsequent fabricating steps of the angular-position transmitter, as a result of which the cost of manufacture can be further reduced. The angular-position indicator based on the flux-gate principle of the invention is characterized, as a whole, by a high degree of reliability, relatively high accuracy due to the merely slight influence of surrounding temperature and humidity, and, furthermore, for a number of reasons, by simple and inexpensive series manufacture. Further advantages are obtained in connection with the following further developments of the angular-position transmitter:

Due to the fact that the toroidal core (9), which bears the sensor coils (11, 12), as well as the turnable magnet (5) are arranged in a space (housing 1) which is substantially shielded from the terrestrial magnetic field, the signal voltages produced by the sensor coils depend, for all practical purposes, only on the position of the turnable magnet. Falsifying influences of the earth's magnetic field which can be disturbing, in particular, in the case of vehicles having such angular-position transmitters, are avoided without any expensive measures for compensation.

The turnable magnet, on the one hand, and the toroidal core together with its coils as well as at least a part of the electronic system connected with the coils are to particular advantage arranged in separate spaces. The inner space in which the toroidal core together with its coils and the electronic system are arranged can thereby be developed entirely closed off, without providing expensive passages for a shaft which moves the turnable magnet. The elements which are arranged in the inner space are thus substantially protected from environmental influences such as temperature, humidity and gasses.

According to a feature of the invention, the turnable magnet (5) is arranged outside of a closed inner space (3). In the space the toroidal core (9) and at least parts of an electronic system (15–19) with the sensor coils for evaluation of the two signals and feeding an exciter coil on the toroidal core are arranged.

As already stated, a toroidal core developed as a permanent magnet is not absolutely necessary for the control of the toroidal core; rather, the turnable magnet may have various shapes. The turnable magnet can, therefore, be developed in favorable manner, particularly from a manufacturing standpoint, in particular, as a simple bar magnet connected with an axis of rotation.

Due to the relatively high useful sensitivity of the toroidal core with the sensor coils, the turnable magnet (5) can, in one particularly suitable embodiment, consist essentially of a plastic disk in which permanently magnetized bodies (13, 14) are embedded. The permanently magnetized bodies are thus reliably shielded from many environmental influences without it being necessary for this purpose to arrange the turnable magnet in a hermetically sealed housing.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
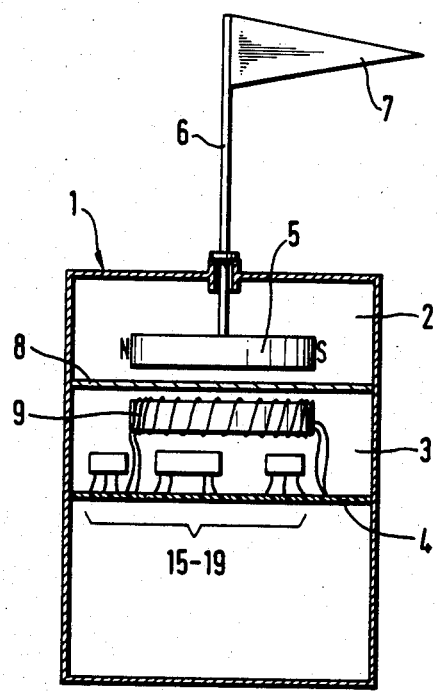
FIG. 1 is an angular-position transmitter connected to a weather vane, shown in a section through the housing which contains the angular-position transmitter.

Referring to FIG. 1, a housing 1 is divided into two inner spaces 2 and 3. The entire housing consists preferably of magnetically shielding material, at least the upper inner space 2 and the lower inner space 3 above a plate 4 being shielded.

A magnet 5 is turnable within the upper inner space 2. The turnable magnet is connected to a weather vane 7 by a shaft 6 which passes through the cover of the housing.

A wall of magnetically permeable material tightly seals off the upper inner space from the lower inner space 3. Within said lower inner space a toroidal core of a flux-gate arrangement is so arranged that the plane of the toroidal core and the plane in which the magnet 5 turns are parallel to each other.

Figure 2A:
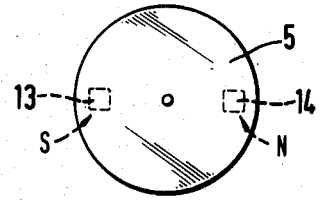
FIGS. 2a and 2b are a top view and a cross-section respectively through the turnable magnet.
Figure 2B:
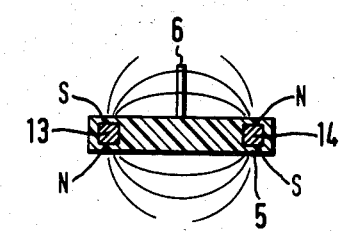

The development of the turnable magnet can be noted from FIGS. 2a and 2b; the magnet 5 consists essentially of a plastic disk in which two permanently magnetized bodies 13 and 14 are embedded symmetrically to the center of the disk in such a manner that the permanently magnetized bodies are not exposed to the surrounding atmosphere. The magnetization of the bodies 13, 14 can be noted from the indicated course of the lines of flux in FIG. 2b.

Figure 3:
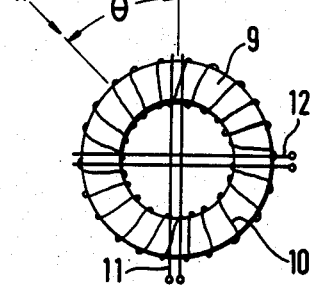
FIG. 3 is a diagrammatic drawing of the toroidal core with the coils wound on it.

The construction of the flux-gate toroidal core is diagrammatically shown in FIG. 3. The toroidal core 9 is wound with an exciter coil 10. Sensor coils 11 and 12 are wound at right angles to each other over two opposite sections of the toroidal core so that signals corresponding to the cosine and the sine of the angle of incidence of the principal direction of the magnetic field are induced in these coils. This angle is designated $\theta$.

The electronic system for the evaluation of the signals induced in the sensor coils 11, 12 and for the production of the current fed into the exciter coil 10, is arranged on the plate 4 within the lower inner space 3. A basic circuit diagram of this electronic system is shown in FIG. 4.

Figure 4:
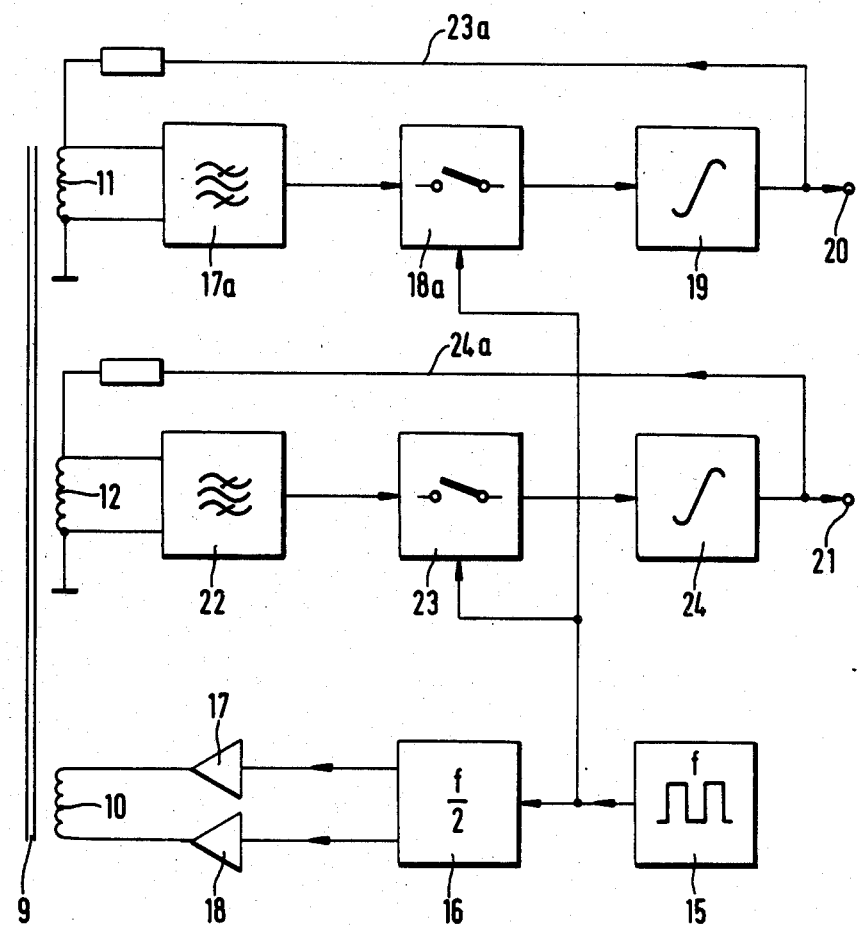
FIG. 4 is a basic circuit diagram of the electronic system provided for the exciting of the toroidal core and the processing of the signal voltages induced in the sensor coils.

The toroidal core 9 of the flux-gate arrangement is linearly symbolized in FIG. 4. The exciter coil 10 is fed with a current of the frequency f/2. For this purpose, a clock generator 15 produces a rectangular signal the frequency f of which is divided in a frequency divider 16. From the signal of the frequency f/2 the rectangular exciting current which flows through the exciter coil 10 is formed by amplifiers 17, 18.

A similar electronic system for evaluation of the signal induced in the sensor coil is provided at each of the sensor coils 11, 12:

Thus the sensor coil 11 is connected to a bandpass filter 17a which extracts the second harmonic of the voltage induced in the sensor coil. The second harmonic is detected by a phase-controlled switch 18a whose control signal of frequency f is taken from the clock generator. After the detection of the second harmonic, integration takes place in an integrator 19 which thus supplies a signal of constant voltage to a terminal 20, which signal is proportional to the sine of the angle of incidence $\theta$, i.e. the position of the turnable magnet 5.

In similar manner, a constant voltage signal which is proportional to the cosine of the angle of incidence $\theta$ is present at the terminal 21. For this there are used a bandpass filter 22, a phase-controlled detector 23, and an integrator 24.

From each of the terminals 20, 21 a negative feedback line 23a, 24a extends to the corresponding sensor coils 11 and 12 respectively. Negative feedback lines serve to reduce undesired non-linearities of this flux-gate arrangement. The sensitivity of the flux-gate arrangement is thereby stabilized at the same time.

The evaluation of the signal voltages at the terminals 20 and 21 can be effected in traditional manner, compatible with an angular-position transmitter having Hall elements, in the manner that these voltage signals are fed, for instance, to a quotient-measuring mechanism which assumes a position proportional to the position of the weather vane 7. This position is practically independent of the direction and intensity of the terrestrial magnetic field.

I claim:

1. In a contactless electronic angular-position transmitter for a rotatable mechanical member, in particular a weather vane, having a magnet coupled to said mechanical member and which is rotatable in proportion to the angle to be measured and having two sensor elements arranged at right angles to each other to be acted on by a magnetic field produced by the rotatable magnet so as to produce one electric signal each, each signal being a measure of one of two magnetic field components which are oriented at right angles to each other, the improvement comprising a toroidal core of a magnetic field detector developed in accordance with the flux-gate principle, and wherein a field produced by said magnet is substantially stronger than the earth's magnetic field, and each of the two sensor elements comprises at least one sensor coil wound about said toroidal core in a diametrical plane, said magnet being rotatable in a plane parallel to a plane of said core for magnetic interaction with the sensor coil in each of said sensor elements; the transmitter further comprising means enclosing said core and said magnet for excluding the earth's magnetic field, and an electronic system coupled to said sensor coils, and wherein said electronic system includes means for extracting a second harmonic component of a signal induced in a sensor coil for determination of angular position of the rotatable member, and said toroidal core and said rotatable magnet are positioned in a space which is substantially shielded from the terrestrial magnetic field by said field excluding means; the transmitter further comprising an exciter coil-disposed on said core, and wherein said rotatable magnet is positioned outside of a closed inner space; said toroidal coil, said sensor coils and at least a part of said electronic system coupled to said sensor coils being positioned within said closed inner space for evaluation of the two signals and for feeding said exciter coil, and said closed inner space is a closed-off subdivision of said first-mentioned space.

2. The contactless electronic angular-position transmitter according to claim 1, wherein said field excluding means comprises a housing of magnetically shielding material, said space being formed by said housing.

3. In a contactless electronic angular-position transmitter for a rotatable mechanical member, in particular a weather vane, having a magnet coupled to said mechanical member and which is rotatable in proportion to the angle to be measured and having two sensor elements arranged at right angles to each other to be acted on by a magnetic field produced by the rotatable magnet so as to produce one electric signal each, each signal being a measure of one of two magnetic field components which are oriented at right angles to each other, the improvement comprising a toroidal core of a magnetic field detector developed in accordance with the flux-gate principle, and wherein a field produced by said magnet is substantially stronger than the earth's magnetic field, each of the two sensor elements comprises at least one sensor coil wound about said toroidal core in a diametrical plane, said magnet being rotatable in a plane parallel to a plane of said core for magnetic interaction with the sensor coil in each of said sensor elements, said toroidal core and said rotatable magnet are positioned in a closed inner space which is substantially shielded from the terrestrial magnetic field, said transmitter further comprising an exciter coil disposed on said core, an electric circuit coupled to said sensor coils, and a housing of magnetically shielding material enclosing said space, and wherein at least a part of said electric circuit is positioned within said closed inner space for evaluation of the signal of said sensor coils and for feeding said exciter coil, and wherein said rotatable magnet is positioned in a closed-off subdivision of said space, and wherein said electric circuit includes means for extracting a second harmonic component of a signal induced in a sensor coil for determination of angular position of the rotatable member.

* * * * *